US009141628B1

(12) United States Patent
Zimmermann et al.

(10) Patent No.: US 9,141,628 B1
(45) Date of Patent: Sep. 22, 2015

(54) RELATIONSHIP MODEL FOR MODELING RELATIONSHIPS BETWEEN EQUIVALENT OBJECTS ACCESSIBLE OVER A NETWORK

(75) Inventors: Gil Zimmermann, Newton, MA (US); Ron Zalkind, Newton, MA (US); Tsahy Shapsa, Newton, MA (US)

(73) Assignee: Cloudlock, Inc., Waltham, MA (US)

( * ) Notice: Subject to any disclaimer, the term of this patent is extended or adjusted under 35 U.S.C. 154(b) by 1152 days.

(21) Appl. No.: 12/551,732

(22) Filed: Sep. 1, 2009

Related U.S. Application Data (60) Provisional application No. 61/112,585, filed on Nov. 7, 2008.

(51) Int. Cl.
*G06F 7/00* (2006.01)
*G06F 17/30* (2006.01)

(52) U.S. Cl.
CPC .............................. *G06F 17/30106* (2013.01)

(58) Field of Classification Search
None
See application file for complete search history.

(56) References Cited

U.S. PATENT DOCUMENTS

| | | | |
|---|---|---|---|
| 6,317,749 B1 | 11/2001 | Ghatate | |
| 6,694,307 B2 | 2/2004 | Julien | |
| 7,062,541 B1 * | 6/2006 | Cannon et al. | 709/219 |
| 7,103,593 B2 | 9/2006 | Dean | |
| 7,124,413 B1 | 10/2006 | Klemm et al. | |
| 7,139,752 B2 | 11/2006 | Broder et al. | |
| 7,143,398 B2 | 11/2006 | Chang et al. | |
| 7,206,791 B2 | 4/2007 | Hind | |
| 7,249,117 B2 | 7/2007 | Estes | |
| 7,275,079 B2 | 9/2007 | Brodsky et al. | |
| 7,283,989 B1 | 10/2007 | Stephens | |
| 2004/0093331 A1 * | 5/2004 | Garner et al. | 707/3 |
| 2004/0210607 A1 * | 10/2004 | Manchanda et al. | 707/203 |
| 2004/0243645 A1 * | 12/2004 | Broder et al. | 707/200 |
| 2007/0179959 A1 * | 8/2007 | Sharma et al. | 707/100 |
| 2007/0198478 A1 | 8/2007 | Yu et al. | |
| 2008/0189240 A1 * | 8/2008 | Mullins et al. | 707/2 |
| 2009/0171999 A1 * | 7/2009 | McColl et al. | 707/101 |

* cited by examiner

*Primary Examiner* — Loan T Nguyen
(74) *Attorney, Agent, or Firm* — Robert Plotkin, P.C.

(57) ABSTRACT

A relationship model system automatically recognizes relationships among data in a local IT environment. Such data may be derived from multiple sources, such as multiple devices and/or software applications of different types. Such data are collected automatically, remotely, and transparently from the local IT environment. Relationships among the data are recognized automatically by correlating data from the multiple sources. Records of such relationships are stored remotely in a relationship model. The system may draw conclusions based on the recognized relationships and take actions in response to those conclusions.

50 Claims, 6 Drawing Sheets

| Filename | Path | Creation Date | Size | Backup Date |
|---|---|---|---|---|
| Memo.doc | G:\Userdata | 01/07/2005 | 43844 | 02/08/2008 |
| Addresses.xls | G:\Userdata | 03/17/2006 | 101292 | 06/06/2008 |
| cache.dat | C:\ | 12/03/2007 | 496 | 06/06/2008 |
| Image8.jpg | C:\Photos | 04/12/2007 | 68441 | 05/04/2008 |

| Filename | Path | Username | Rights |
|---|---|---|---|
| Memo.doc | G:\Userdata | jsmith | RWD |
| *.xls | G:\Userdata | pjones | R |
| CACHE.DAT | \ | jsmith | RW |
| Picture.gif | C:\Photos | jsmith | RWD |

| Filename | Path | Creation Date | Size | Backup Date | Username | Rights |
|---|---|---|---|---|---|---|
| Memo.doc | G:\Userdata | 01/07/2005 | 43844 | 02/08/2008 | jsmith | RWD |
| Addresses.xls | G:\Userdata | 03/17/2006 | 101292 | 06/06/2008 | pjones | R |
| cache.dat | C:\ | 12/03/2007 | 496 | 06/06/2008 | jsmith | RW |

RELATIONSHIP MODEL FOR MODELING RELATIONSHIPS BETWEEN EQUIVALENT OBJECTS ACCESSIBLE OVER A NETWORK

CROSS-REFERENCE TO RELATED APPLICATIONS

This application claims priority from commonly-owned U.S. Prov. Pat. App. Ser. No. 61/112,585, filed on Nov. 7, 2008, entitled, "Relationship Model," which is hereby incorporated by reference herein.

BACKGROUND

Computer systems include both "structured" and "unstructured" data. Components of structured data are stored in a way that enables a computer to unambiguously identify the meanings of those components. One example of structured data is a database table having a set of fields (such as "name," "address," and "telephone number") in which different types of data are stored. Because the data in such a table are divided into fields, each of which stores only data of a particular type, a computer can identify data of each type unambiguously. For example, a database system can determine whether the table includes any data representing a person named "John Smith" by searching only the "name" field of each record in the database. As this example illustrates, the fact that the table is structured facilitates performing automated processing operations (such as searching) on that data. In fact, structured data can typically only be accessed and processed through software applications, not viewed directly.

In contrast, components of unstructured data are not stored in a manner which unambiguously specifies their meaning to a computer. A word processing document containing a business memorandum is an example of unstructured data. Although such a document may include header text which specifies components of the document, such as "Subject:", "From:", "To:", and "Date:", such text is not easily processable by a computer even though its meaning is easily understood by a human. The reason is that the text "Subject:" is stored as text in a manner that does not distinguish it from any other text in the same document. As a result, a computer cannot easily discern that the text following the text "Subject:" refers to the subject of the memo, since the computer does not understand the meaning of words in human languages. This makes unstructured data more costly and time-consuming to process than structured data.

This is a significant problem because unstructured data comprises 85% of all digitally-stored data, and 80% of all data stored by businesses. Unstructured data represent a wide variety of commonly-used data, such as word processing documents, email messages, web pages, and metadata stored by applications such as file systems and backup systems. Note that as even these simple examples illustrate, data may be "structured" for one purpose but "unstructured" for another. For example, a user-created spreadsheet may be structured in the sense that it is divided into columns for storing different types of data, but unstructured from the perspective of the document management system (DMS) used by the user's enterprise, if that DMS is not programmed to understand the structure of the user's spreadsheet and therefore cannot search through or otherwise process the data in the spreadsheet intelligently. An email message may be considered semi-structured, because it contains both headers, which provide structure to the message, and unstructured text. Some data, such as metadata, may come in both structured and unstructured forms.

The information stored in unstructured data often is highly valuable. For example, the email messages sent between members of a project team may contain insights into the development of the project over time, such as which decisions led to increased efficiency. Yet such insights remain undiscovered if they are prohibitively expensive or time-consuming to extract from the unstructured data in which they are stored. Today's businesses often continue to rely on manual human analysis of unstructured data (such as human review of the project emails just mentioned), aided by search engines, to extract insights from unstructured data. Such manual analysis, which does not differ fundamentally from reviewing the same data on paper, is tedious, time-consuming, and prone to error. Furthermore, the amount of effort required to perform such analyses often leads businesses to not even attempt to perform them.

As a result, vast amounts of valuable information stored in unstructured data remain untapped. Furthermore, the amount of unstructured data stored by today's businesses is growing at a rate of 70% year over year. Therefore we should expect the value of untapped information stored in the form of unstructured data to grow commensurately.

In addition, unstructured data are also highly distributed and dynamic. Documents stored in a single corporate file system may be distributed across multiple servers located in multiple facilities. The location of any individual file may change from day to day, often automatically and without knowledge of the system's users, such as when the system's network-attached storage subsystem is upgraded or relocated. The distributed and dynamic nature of unstructured data poses challenges for, and must be taken into account by, anyone who strives to extract value from unstructured data.

Unstructured data pose particular problems for managers of information technology (IT) systems. The manager of an IT system at a modern enterprise may have responsibility for ensuring that only authorized personnel have access to components of the system, managing the storage capacity of the system to ensure that it does not run out of storage space, performing chargeback (i.e., charging each division/department of the enterprise for its share of use of the enterprise's data), and keeping all components of the system in good working order to minimize downtime. Performing these and other functions successfully requires the IT manager to have accurate and up-to-date information about the state of the IT system. Yet IT managers often do not have such information because it is too difficult and expensive to extract it.

IT managers, however, cannot simply decline to perform these functions. Auditing requirements, such as those imposed by the Sarbanes-Oxley Act, may require IT managers to track and provide certain information stored in the IT system. Corporate policies may require that certain specified information be backed up, retained for a certain period of time, or destroyed after a certain period of time, despite the difficulty of locating such information and applying the correct procedures to it. Litigation may impose requirements on IT managers, such as the need to produce documents satisfying specified criteria or to prove that reasonable steps have been taken to secure data.

Consider, for purposes of example, an IT environment in a modern enterprise which contains 300 terabytes (TB) of data. For purposes of comparison, consider that approximately 5,000,000 typical word processing files can be stored in 1 TB of data. Such an IT environment also includes a large number of devices of many types, such as desktop and laptop computers, mobile computing devices (such as cellular telephones and personal digital assistants (PDAs)), printers, monitors, networking devices, and network-attached storage devices. Such an IT environment also includes a large number of software programs of many types, such as operating systems, word processing software, database management systems, backup applications, and network security applications. Different versions of the same device and/or application may exist simultaneously in the same IT environment.

Although it would be difficult enough for an IT manager to manage such an environment due to its sheer size and complexity, the management task is further complicated by additional factors. For example, the IT environment is not static; it changes over time. Users of the system move temporarily (such as when they log in to the system from a satellite office rather than their home office) and permanently (such as when they relocate to a new home office). Devices, software, and data also move within the system. Sometimes it is desirable for such changes in location to be hidden from end users. For example, if the data stored in a file system directory moves from one physical hard disk drive to another, such a change should be hidden from software applications so that they do not break and need to be reprogrammed. In other situations, however, changes to the IT system should be visible to end users. For example, if an employee moves from one department to another, it may be desirable to prohibit that employee from accessing equipment (such as servers and printers) in the employee's old department. Ensuring that the IT system functions smoothly in the face of such changes to the system itself poses a significant challenge to IT managers.

What is needed, therefore, are improved techniques for managing data in an IT environment.

SUMMARY

A relationship model system automatically recognizes relationships among data in a local IT environment. Such data may be derived from multiple sources, such as multiple devices and/or software applications of different types. Such data are collected automatically, remotely, and transparently from the local IT environment. Relationships among the data are recognized automatically by correlating data from the multiple sources. Records of such relationships are stored remotely in a relationship model. The system may draw conclusions based on the recognized relationships and take actions in response to those conclusions.

One embodiment of the present invention is directed to a computer-implemented method comprising: (A) obtaining, over a network, first data maintained by a first resource; (B) obtaining, over the network, second data maintained by a second resource; (C) identifying a first portion of the first data, wherein the first portion relates to a first object; (D) identifying a second portion of the second data, wherein the second portion relates to a second object; (E) determining whether the first object and the second object are equivalent to each other; and (F) if it is determined that the first object and the second object are equivalent to each other, then: storing an indication of a relationship between the first portion and the second portion remotely from the first and second resources.

Another embodiment of the present invention is directed to a computer-implemented method comprising: (A) obtaining first data maintained by a first resource; (B) obtaining second data maintained by a second resource; (C) identifying a first portion of the first data, wherein the first portion relates to a first object; (D) identifying a second portion of the second data, wherein the second portion relates to a second object; (E) determining whether the first object and the second object are equivalent to each other; and (F) if it is determined that the first object and the second object are equivalent to each other, then: (F1) storing an indication of a relationship between the first portion and the second portion.

Yet another embodiment of the present invention is directed to a computer-implemented method comprising: (A) obtaining, over a network, first data maintained by a first resource, wherein the first data contains a first portion that relates to a first object; (B) obtaining, over the network, second data maintained by a second resource, wherein the second data contains a second portion that relates to the first object; (C) storing an indication of a relationship between the first portion and the second portion; (D) receiving a query over the network, wherein the query includes a first predicate and a second predicate; (E) determining whether the first portion satisfies the first predicate of the query; (F) determining whether the second portion satisfies the second predicate of the query; and (G) providing a response to the query over the network based on the outcomes of the determinations in (E) and (F).

Yet a further embodiment of the present invention is directed to a computer-implemented method comprising: (A) obtaining, over a network, a first instance of first data maintained by a first resource at a first time, wherein the first instance of the first data is associated with a first time and contains a first instance of a first portion that relates to a first object at the first time; (B) obtaining, over the network, a first instance of second data maintained by a second resource, wherein the first instance of the second data contains a first instance of a second portion that relates to the first object at the first time; (C) storing an indication of a relationship between the first instance of the first portion and the first instance of the second portion; (D) obtaining, over the network, a second instance of the first data, wherein the second instance of the first data is associated with a second time and contains a second instance of the first portion that relates to the first object at the second time; (E) obtaining, over the network, a second instance of the second data, wherein the second instance of the second data contains a second instance of the second portion that relates to the first object at the second time; (F) storing an indication of a relationship between the second instance of the first portion and the second instance of the second portion; (G) drawing a conclusion about the first portion based on the first instance of the first portion, the second instance of the first portion, the first instance of the second portion, and the second instance of the second portion.

Other features and advantages of various aspects and embodiments of the present invention will become apparent from the following description and from the claims.

DETAILED DESCRIPTION

One reason that managing an IT environment can be challenging is that keeping an IT system running smoothly requires identifying and keeping track of relationships among data in the system. For example, a backup system may expect certain files to be stored in a particular location in the file system. This reflects a relationship between data maintained by the backup system and data maintained by the file system. If the files move within the file system (or to a different file system) but the backup system is not notified of that change, the backup system may malfunction. Today, IT managers typically keep track of such relationships manually and update the IT environment's subsystems (such as the backup system in the example just described) accordingly. Doing so can be tedious, time-consuming, and prone to error.

In contrast, embodiments of the present invention automatically recognize relationships among data in an IT environment, such as data from multiple sources, such as multiple devices and/or software applications of different types. Such data are collected automatically, remotely, and transparently from the IT environment. Relationships among the data are recognized automatically by correlating data from multiple sources. Records of such relationships are stored remotely in a relationship model. Copies of some or all of the data may also be stored in the relationship model.

The data may be collected from the IT environment without opening files in which the data are stored and without otherwise modifying the data or the IT environment more generally. For example, the data collected may be metadata, such as file creation times and file sizes, file backup status, and file access privilege information. Such metadata may be transmitted and/or copied from the local IT environment to a remote location without opening the files in which such metadata are stored and without modifying the metadata in the local IT environment. More generally, the data may be collected without changing any of the applications or devices in the local IT environment, and without requiring the users of the local IT environment to change their behavior.

The remote relationship model may be accessible to users of the local IT environment through a single interface. For example, users of the local IT environment may query the relationship model through the interface to obtain information about relationships represented by the relationship model. In particular, users of the local IT environment may query the relationship model for information derived from multiple sources, such as multiple devices and/or software applications of different types. In this way, users may use the relationship model to derive information which could not have been derived from any single source in the local IT environment.

The system may also process information in the relationship model automatically (i.e., not in response to user queries) to draw conclusions about data in the local IT environment and to take action based on such conclusions. For example, the system may take multiple snapshots of meta-data in the local IT environment at different points in time and thereby derive multiple instances of the relationship model at different points in time. The system may store a record the time at which each snapshot was taken so that the time of each snapshot may be used in subsequent processing. For example, the system may automatically identify trends in the local IT environment based on such a sequence of relationship model instances. For example, the system may automatically predict when a backup system will run out of storage space based on trends in backup system storage utilization and trends in file system storage capacity. In response to predicting that backup storage will run out in the near future, the system may automatically take action, such as by automatically notifying a system administrator of the need to upgrade storage capacity. Logs of data and/or metadata from one or more sources may be added to the system retroactively and then used in the same manner as logs from sources that were tracked in real-time.

Embodiments of the Present Invention automatically recognize relationships among data in an IT environment, such as data from multiple sources, such as multiple devices and/or software applications of different types. Such data are collected automatically, remotely, and transparently from the IT environment. Relationships among the data are recognized automatically by correlating data from multiple sources. Records of such relationships are stored remotely in a relationship model. Copies of some or all of the data themselves may also be stored in the relationship model.

Figure 1:
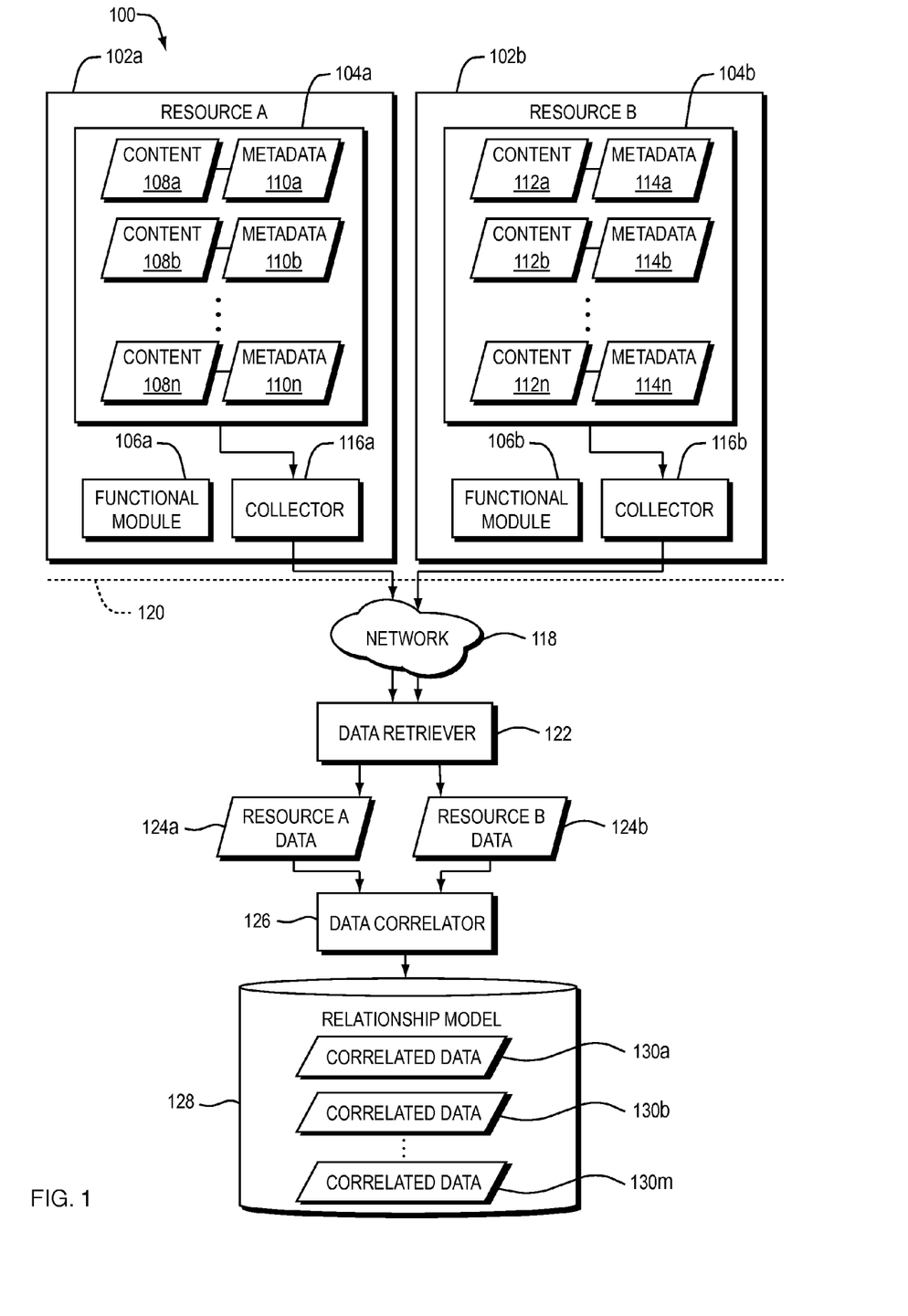
FIG. 1 is a dataflow diagram of a system for creating a relationship model by correlating data from a plurality of resources in an IT environment according to one embodiment of the present invention.
Figure 2:
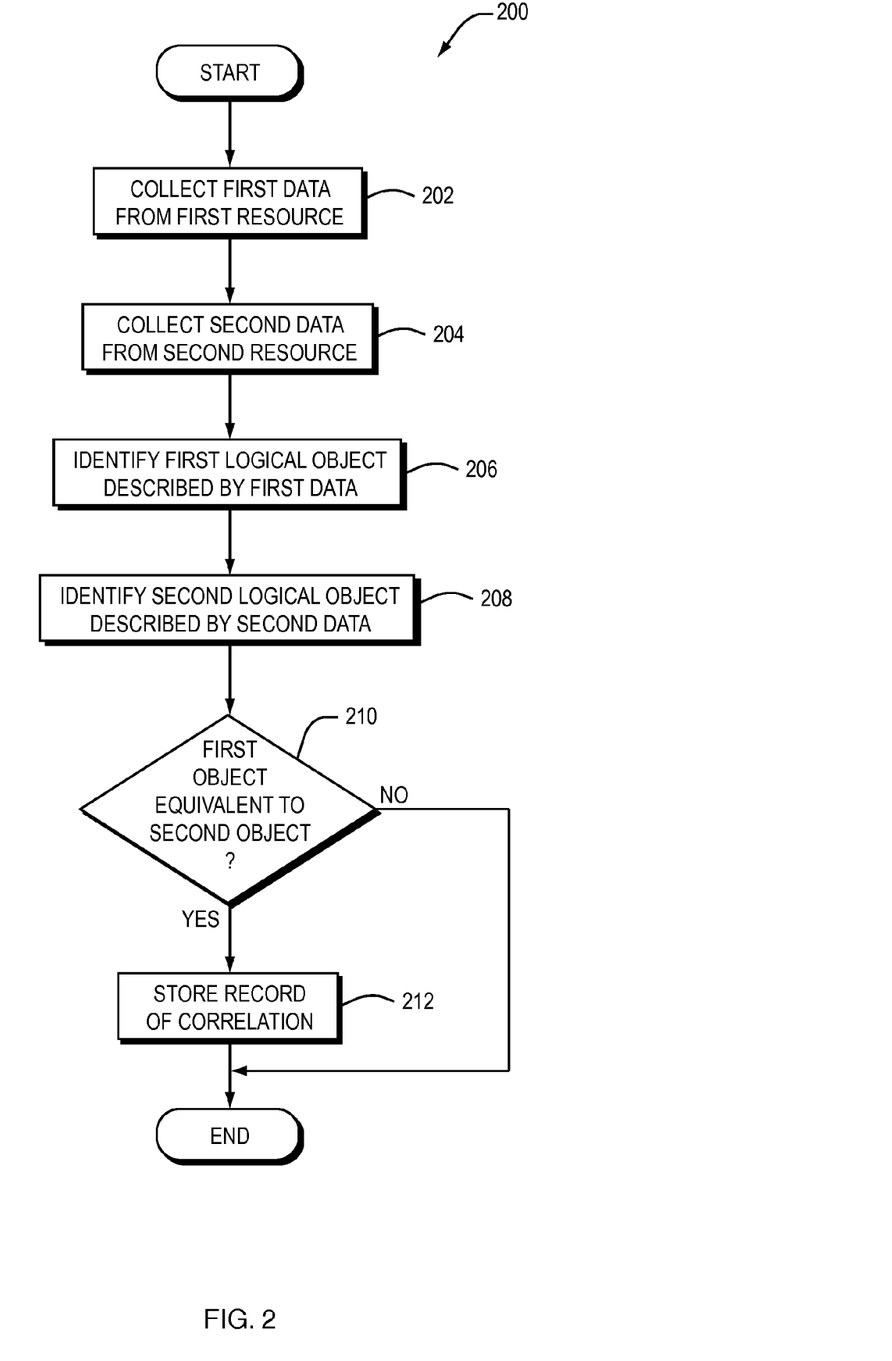
FIG. 2 is a flowchart of a method performed by the system of FIG. 1 according to one embodiment of the present invention.

For example, referring to FIG. 1, a dataflow diagram is shown of a system 100 for correlating data from multiple sources according to one embodiment of the present invention. Referring to FIG. 2, a flowchart is shown of a method 200 performed by the system 100 according to one embodiment of the present invention.

The system 100 includes multiple resources. For purposes of example and ease of illustration, two resources 102*a-b* are shown in FIG. 1. The system 100 may, however, include more than two resources. Each of the resources 102*a-b* may, for example, be a device in an IT environment, such as a computer, hard disk drive, telephone, or networking device (e.g., router, switch, or gateway); or a software application or other software-based system in the IT environment, such as an operating system, file system, backup system, or network access control (NAC) system. Each of the resources 102*a-b* may include a combination of hardware and software.

A resource may be "in" the IT environment even if it is not physically located in the same place as other resources in the IT environment. For example, although one or more of the resources 102*a-b* may be located within the same enterprise as other components shown in FIG. 1, one or more of the resources 102*a-b* may be located in a different physical location than other components shown in FIG. 1 but accessible to such components over a network, such as a WAN or a VPN over the Internet. As yet another example, the resources 102*a-b* may be accessible over the Internet to other components within the same enterprise, but not be within the same corporate network as such components. As an example of the latter, resource 102*a* may be a resource (such as an online file storage system) that is in the "cloud" and is accessible over the Internet to a user who logs in to the resource 102*a*. The data (e.g., files) stored in such an online (cloud) resource may or may not be accessible to other resources (such as the file system or backup system) within the corporate network to which the user's computer is connected. Such a resource may still, however, be considered to be "in" the user's IT environment for purposes of the description herein.

Each of the resources 102*a-b* is depicted abstractly as a discrete system in FIG. 1 for ease of illustration and explanation. In practice, however, resources 102*a-b* may overlap. For example, resource 102*a* may be a network file system and resource 102*b* may be a backup application, both of which execute on a single physical computer.

Resources 102*a* and 102*b* include data 104*a* and 104*b*, respectively. Although data 104*a-b* may be any data stored in or otherwise accessible to resources 102*a-b*, in the particular example shown in FIG. 1 the data 104a-b include two kinds of data, referred to herein as "content" and "metadata." More specifically, the data 104a in resource 102a includes content 108a-n and corresponding metadata 110a-n, while the data 104b in resource 102b includes content 112a-n and corresponding metadata 114a-n.

In general, the term "metadata" refers to data which describe other data. For example, if resource 102a is a file system, then contents 108a-n may be the contents of files stored in the file system, while metadata 110a-n may be data stored by the file system which describes the files, such as the files' filenames, creation times, and sizes. In FIG. 1, a line connects each unit of content to its corresponding metadata (such as the line connecting content 108a to metadata 110a) to indicate that the unit of content is described by the corresponding metadata.

Resources 102a-b may further include functional modules 106a-b, respectively, which enable resources 102a-b to perform their respective functions. For example, if resource 102a is a file system, then functional module 106a may be software code which performs the functions of the file system. Alternatively, for example, if resource 102a is a hard disk drive, then functional module 106a may be hardware components for storing and retrieving data from the hard disk.

The system 100 also includes a data retriever 122 for retrieving data from the resources 102a-b. The data retriever 122 may retrieve content and/or metadata from the resources 102a-b. In the embodiment illustrated in FIG. 1, data retriever 122 retrieves data from the resources 102a-b over a network 118, which may be any kind of wired and/or wireless network, such as the public Internet, a local intranet, LAN (local area network), WAN (wide area network), or any combination thereof.

The following description refers to a "local" IT environment which includes the resources 102a-b. One example of a "local" IT environment is the collection of all physical IT resources (hardware and software) contained within a physical office of an enterprise. In practice, however, the IT environment of a particular enterprise may be distributed across multiple physical locations and tied together by one or more networks. The enterprise may even utilize services in the "cloud," such as network backup services, which consist of IT resources located far from the physical offices of the enterprise, but which are accessible to the enterprise's IT environment as if they were within the enterprise's physical offices. All such resources are considered "local" IT resources in the following description. In FIG. 1, resources above line 120 are considered to be "local" to the IT environment of resources 102a-b, while all resources below line 120 are considered to be "remote" to the IT environment of resources 102a-b.

For purposes of the following description, assume that resource 102a is a backup subsystem of the local IT environment. Further assume that the content 108a-n stored by the resource 102a is the set of files that have been backed up by the backup subsystem, and that the metadata 110a-n are data which describe the backed up files. For example, referring to FIG. 3A, a table 300 is shown which represents one example of the metadata 110a-n that may be stored by the backup system 102a. In the example shown in FIG. 3A, the backup subsystem 102a stores the following metadata about each file that it backs up: filename 302a, pathname 302b, creation date 302c, size 302d, and last backup date 302e. This particular set of fields is provided merely as a simplified example and does not constitute a limitation of the present invention.

Figure 3A:
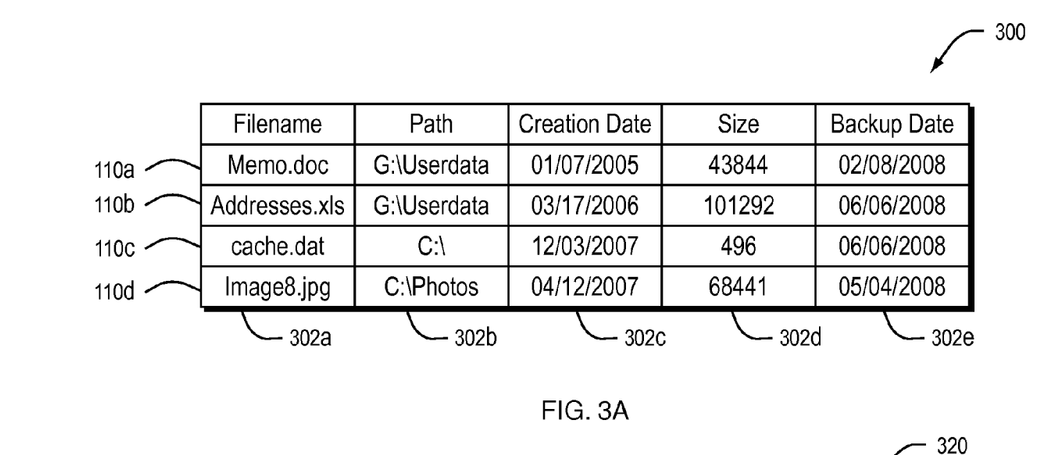
FIGS. 3A-3B are tables illustrating data collected from two IT resources according to one embodiment, of the present invention.

Furthermore, for ease of illustration, the backup system metadata table 300 is illustrated as including four metadata records 110a-d corresponding to four files that have been backed up by the backup system 102a. In practice, however, a backup system may back up thousands or even millions of files. As shown in FIG. 3A, record 110a indicates that a file named "Memo.doc" (field 302a), located in path "G:\User-data" (field 302b) and having creation date Jan. 7, 2005 (field 302c) and size 43,844 (field 302d) was last backed up by the backup system 102a on Feb. 8, 2008. The remaining metadata records 110b-d provide similar information about three other files.

Now assume that resource 102b is a network access control system of the local IT environment. Further assume that the content 112a-n stored by the resource 102b is the set of resources (e.g., files) to which access is controlled by the access control system 102b. Such resources do not need to be stored within the access control system 102b; rather, content 112a-n may be implemented as pointers to or other descriptors of the resources to which access is controlled by the access control system 102b. Assume that the metadata 114a-n are data which describe access control rights to the resources represented by content 112a-n. For example, referring to FIG. 3B, a table 320 is shown which represents one example of the metadata that may be stored by the access control system 102b. In the example shown in FIG. 3B, the access control subsystem 102b stores the following metadata about each file to which it controls access: filename 322a, pathname 322b, username 322c, and access rights 322d. This particular set of fields is provided merely as a simplified example and does not constitute a limitation of the present invention. Furthermore, for ease of illustration and explanation, FIG. 3B only illustrates control of access to files rather than to other kinds of resources (such as hardware devices).

Figure 3B:
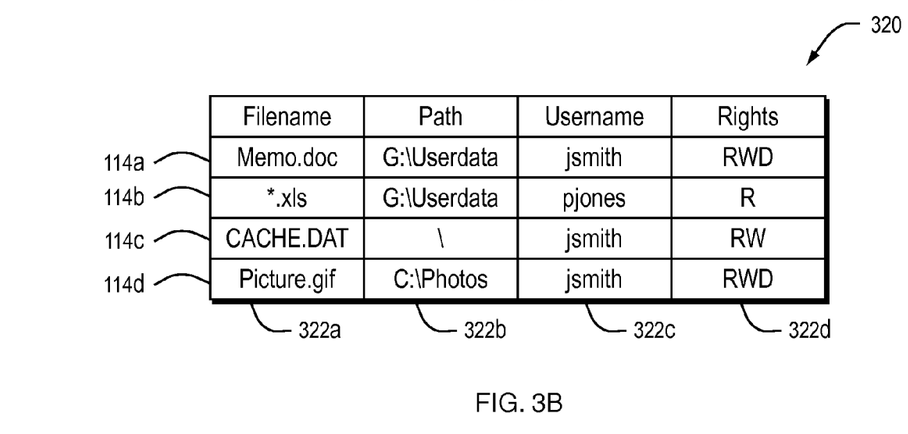

Furthermore, for ease of illustration, the access control system metadata table 320 is illustrated as including four metadata records 114a-d corresponding to four files. In practice, however, a network access control system may control access to large numbers of files and other resources.

As shown in FIG. 3B, record 114a indicates that a user having a username of "jsmith" (field 322c) has read, write, and deletion rights (field 322d) to a file named "Memo.doc" (field 322a) located in path "G:\Userdata" (field 322b). Record 114b indicates that a user having a username of "pjones" (field 322c) has read rights (field 322d) to all files ending in the extension ".xls" (field 322a) located in path "G:\Userdata" (field 322b). Record 114c indicates that a user having a username of "jsmith" (field 322c) has read and write rights (field 322d) to a file named "CACHE.DAT" (field 322a) located in path "\" (field 322b). Finally, record 114d indicates that a user having a username of "jsmith" (field 322c) has read, write, and deletion rights (field 322d) to a file named "picture.gif" (field 322a) located in path "c:\photos" (field 322b).

Returning to FIG. 1, as mentioned above the system 100 includes remote data retriever 122, which retrieves data from the resources 102a-b over the network 118. The data retriever 122 may retrieve data from the resources 102a-b in any of a variety of ways. For example, in the embodiment illustrated in FIG. 1, the resources 102a-b are equipped with collector modules 116a-b, respectively. Collector module 116a collects some or all of the data 104a stored in resource 102a (FIG. 2, step 202), and collector module 116b collects some or all of the data 104b stored in resource 102b (step 204). Collectors 116a-b may, for example, operate under the control of data retriever 122, which instructs the collectors 116a-b to perform functions such as collecting data from the resources 102a-b and transmitting that data over the network 118 to the data retriever 122. Collectors 116a-b may, for example, collect data periodically according to a schedule (which may be dictated by the data retriever 122). Collectors 116a-b may, for example, be integrated within resources 102a-b as standalone software which is separate from resources 102a-b and which communicates with resources 102a-b without requiring resources 102a-b (especially the functional modules 106a-b) to be modified to enable data to be collected from them.

Although in the example shown in FIG. 1, each of the resources 102a-b has its own collector, this is not a requirement of the present invention. Collectors may be matched with resources in any combination. For example, one collector may collect data from multiple resources. As another example, multiple collectors may collect data from a single resource.

The collectors 116a-b may, for example, collect and transmit data according to a pull model, in which the collectors 116a-b collect and transmit data to the retriever 122 in response to requests from the retriever 122, or according to a push model, in which the collectors 116a-b initiate collection of data (e.g., in response to addition, deletion, or modification of data) and proactively transmit that data to the retriever 122. Pull and push models may be combined in various ways. For example, a collector may push a notification of a data change to the retriever 122, in response to which the retriever 122 may pull the actual changed data from the collector. As another example, a collector may pull collection requests from a retriever and then push data out to the retriever.

Similarly, the collectors 116a-b may collect data from the resources 102a-b according to pull or push models, in any combination. For example, the collectors 116a-b may actively pull data from the resources 102a-b. Alternatively, for example, the resources 102a-b may push data to the collectors 102a-b. A particular collector may register to be notified of changes to data maintained by one or more particular resources. When data maintained by a particular resource changes, the resource may notify the collectors(s) that are registered with the resource of the change. The resource may provide the changed data along with the notification, or merely provide the notification, in response to which the registered collector(s) may pull the changed data from the resource. Any of the functions described as performed by the collectors 116a-b may instead be performed directly by the retriever 122, without use of the collectors 116a-b. Any of these techniques may be combined with each other and with other techniques in any way.

These are merely examples, however, and embodiments of the present invention are not limited to any particular technique for collecting data from the resources 102a-b. For example, even the collectors 116a-b themselves are optional; data may be collected from resources 102a-b without using the collectors 116a-b.

Furthermore, data retriever 122 may retrieve some or all of the data 104a-b from resources 102a-b, respectively. For example, data retriever 122 may retrieve only the metadata 110a-n and 114a-n from resources 102a-b, respectively, without collecting any of the content 108a-n and 112a-n. As another example, data retriever 122 may retrieve the metadata 110a-n and 114a-n and then only retrieve portions of the content 108a-n and 112a-n which the metadata 110a-n and 114a-n indicate have changed. As another example, data retriever 122 may retrieve all of the data 104a and 104b. Data retriever 122 may retrieve different portions of the data 104a-b at different times to avoid overloading the network 118 or for other reasons. These are merely examples, however, and embodiments of the present invention are not limited to choosing any particular data to retrieve from the resources 102a-b or to retrieving that data at any particular time.

In general, the data retriever 122 retrieves a unit of data 124a from resource 102a and a unit of data 124b from resource 102b. The system 100 further includes a remote data correlator 126, which determines whether the two units of data 124a and 124b refer to the same object as each other, such as the same file or user account. For example, the data correlator 126 may identify a first object that is referred to by some or all of the first data 124a (FIG. 2, step 206), and identify a second object that is referred to by some or all of the second data 124b (step 208). The data correlator 126 may then determine whether the first object is equivalent to the second object (step 210).

If the data correlator 126 determines that the first and second data units 124a and 124b refer to the same or equivalent object as each other, the data correlator 126 stores a record 130a of the relationship between the first data unit 124a and the second data unit 124b (step 212). The data retriever 122 and data correlator 126 may repeat the steps described above for multiple units of data in the first and second resources 102a-b, thereby producing a relationship model 128 which includes a plurality of relationship records 130a-m. The relationship model 128 may be stored remotely from the local IT environment which contains the resources 102a-b.

The data correlator 126 may perform correlation at any time. For example, the data correlator 126 may perform the correlation method 200 of FIG. 2 immediately after data 124a and data 124b have been retrieved by the data retriever 122. As another example, the data correlator 126 may perform method 200 periodically (e.g., hourly, daily, or weekly) on all data which have been retrieved by the data retriever 122 since the last time the method 200 was performed. As yet another example, the data correlator 126 may perform method 200 on-demand, i.e., in response to a request from a user for information about correlated data. (Furthermore, both collection and correlation of data may be performed on-demand.) These and other ways to time performance of the correlation method 200 may be combined with each other.

The data correlator 126 may perform correlation on all of the retrieved data, or on any portion of the retrieved data, using any method to select the data to correlate. Although in FIG. 1 the correlator 126 is shown below line 120, and therefore is outside the user's IT environment, this merely an example and does not constitute a limitation of the present invention. Rather, the correlator 126 may be inside or outside the user's IT environment. Furthermore, there may be multiple correlators instead of a single correlator. The correlators may be above or below line 120 (and therefore within or outside of the user's IT environment) in any combination. Similarly, the retriever 122 may be inside or outside the user's IT environment. Furthermore, there may be multiple retrievers instead of a single retriever. The retrievers may be above or below line 120 (and therefore within or outside of the user's IT environment) in any combination. The correlator(s) and retriever(s) may cooperate to perform any of the functions described herein with respect to a single retriever and correlator.

Some specific examples will now be provided of how the data correlator 126 may correlate data. Assume for purposes of example that the first data 124a retrieved by the data retriever 122 is record 110a from the backup system 102a (FIG. 3A) and that the second data 124b retrieved by the data retriever 122 is record 114a from the access control system 102b (FIG. 3B). The data correlator 126 may, for example, attempt to determine whether these two units of data 110*a* and 114*a* refer to the same or equivalent object by comparing the contents of the filename and path fields 302*a-b* of backup record 110*a* to the contents of the filename and path fields 322*a-b* of the access control record 114*a*. As can be seen from FIGS. 3A and 3B, the contents of the filename and path fields 302*a-b* of backup record 110*a* are identical to the contents of the filename and path fields 322*a-b* of access control record 114*a*. Therefore the data correlator 126 may conclude that the records 110*a* and 114*a* refer to the same (or equivalent) object, which in this case is a file.

Figure 3C:
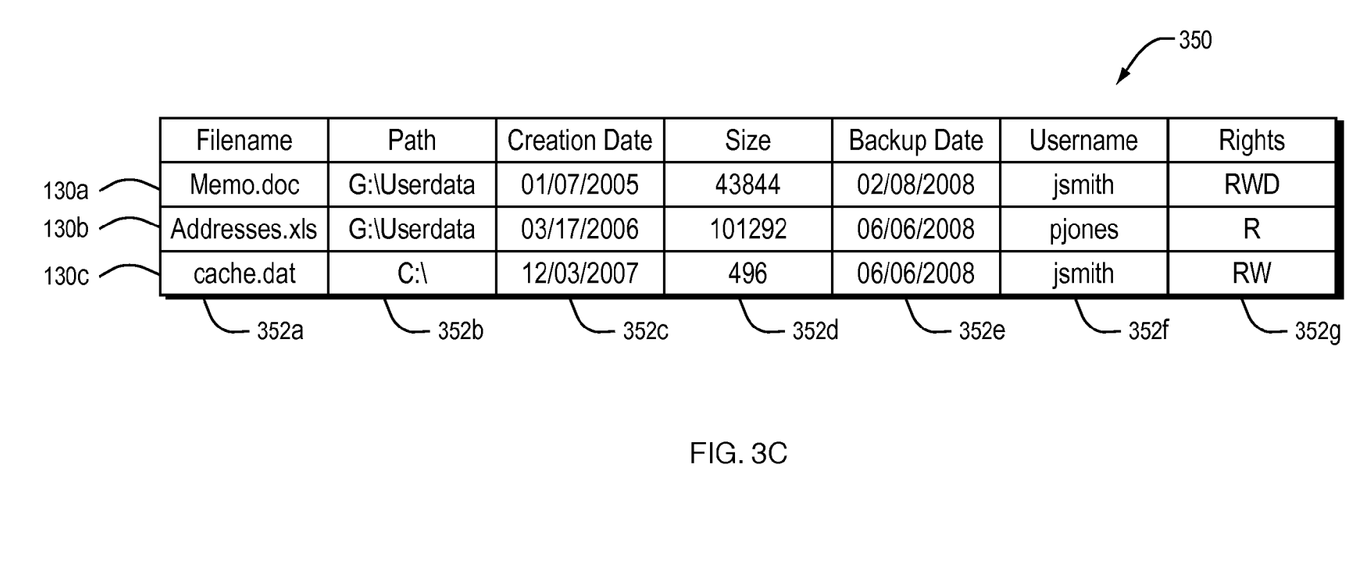
FIG. 3C is a table illustrating data correlated from two IT resources according to one embodiment of the present invention.

Therefore, the data correlator 126 may create record 130*a* (FIG. 3C) to store an indication of the relationship (correlation) between record 110*a* and 114*a*. In particular, FIG. 3C illustrates that record 130*a* indicates that the file named "Memo.doc" (field 352*a*) in path "G:\Userdata" (field 352*b*) has creation date Jan. 7, 2005 (field 352*c*), size 43,844 (field 352*d*), last backup date of Feb. 8, 2008 (field 352*e*), and that the user having username "jsmith" (field 352*f*) has read, write, and delete access rights to the file (field 352*g*). The data correlator 126 may populate the fields 352*a-g* of record 130*a* with data from data units 124*a* and 124*b*.

The record 130*a* may also include an indication of the sources from which the data in record 130*a* was drawn. For example, the record 130*a* may store an indication that the data in record 130*a* was derived from records 110*a* (FIG. 3A) and 114*a* (FIG. 3A). Such an indication may, for example, specifically indicate the source of the data in each of the fields 352*a-g* of the record 130*a*. Such information may be stored in any of a variety of forms.

The data correlator 126 may recognize relationships among data from multiple resources even when those data are not identical to each other. For example, when analyzing record 110*b* (FIG. 3A) from the backup system 102*a* and record 112*b* (FIG. 3B) from the access control system 102*b*, the data correlator 126 may interpret the wildcard in the filename "*.xls" (field 322*a*) to indicate that the user named "pjones" has read access rights to all files ending in the extension ".xls" in path "G:\Userdata." As a result, the data correlator 126 may recognize that record 110*b* (FIG. 3A) and record 112*b* (FIG. 3B) refer to an equivalent object (namely, the file "Addresses.xls" in path "G:\Userdata"), even though the contents of fields 302*a-b* in record 110*b* are not identical to the contents of fields 322*a-b* in record 112*b*. The data correlator 126 may store a record of this correlation in record 130*b*, as shown in correlated data table 350 in FIG. 3C.

As another example of how the data correlator 126 may recognize a relationship between two different data units, consider backup record 110*c* (FIG. 3A) and access control record 112*c* (FIG. 3B). The data correlator 126 may recognize that these two records refer to the same object (i.e., file) even though the filename "cache.dat" (FIG. 3A) is not identical to the filename "CACHE.DAT" (FIG. 3B) and even though the pathname "C:\" (FIG. 3A) is not identical to the pathname "\" (FIG. 3B). In this case, the data correlator 126 may apply rules defining the equivalence of uppercase to lowercase in filenames, and rules defining equivalence of pathnames to each other, to determine that records 110*c* and 112*c* refer to the same object. The data correlator 126 may store a record of this correlation in record 130*c*, as shown in FIG. 3C.

These are merely examples of techniques that the data correlator 126 may use to determine whether two units of data refer to the same or equivalent object as each other. As another example, when comparing usernames to, each other, the data correlator 126 may consider common variations of a first name (such as "Robert," "Rob," and "Bob") to be equivalent to each other. As a result, the data correlator 126 may consider the username "RobertSmith" in an access control system to refer to the same object (i.e., user account) as the username "BobSmith" in a file system.

As another example, the data correlator 126 may consider files having the same filename, pathname, and creation date but different sizes and modification dates to refer to the same or equivalent object (i.e., file). As yet another example, the data correlator 126 may consider descriptors of physical resources (such as hard disk drives) having the same serial number to be equivalent to each other even if other features of those resources differ from each other.

As an additional example, consider a NAC system which has an indication that a file is stored at C:\Finance\Payroll.xls, and a backup system which has an indication that a folder at C:\Finance should be backed up weekly. The correlator 126 may conclude that since the file Payroll.xls is stored within the folder C:\Finance, the file Payroll.xls should therefore be backed up weekly. Now assume that the correlator 126 discovers that the file Payroll.xls has moved to a folder other than C:\Finance, and that the backup system's policy for the new folder is to back up the new folder once a month. The correlator 126 may detect that the file Payroll.xls has moved to a folder with a different backup policy than the previous folder in which Payroll.xls was stored, and take an appropriate action in response, such as alerting the system administrator to the change, and asking the system administrator to make a decision regarding which backup policy to apply to the moved filed Payroll.xls.

As yet another example, consider a file system which maintains an access control list which indicates the access control rights that different users have to resources (such as files and folders) within the file system. The data retriever 122 may retrieve such access control information from the file system. Now assume that a particular permission setting specifies that an entire group, such as the finance department of a company, has access to a particular folder. The data retriever 122 may retrieve the identities of all users in the finance group from a directory service. The correlator 126 may then correlate the access control information retrieved from the file system with the information retrieved from the directory service to identify the specific users in the finance group which have access to a particular folder.

Any measure of equivalence may be used, and any threshold may be applied to determine whether two objects are equivalent to each other. For example, a procedure may be used to produce a measure of similarity between two usernames. Such a measure may be represented, for example, as a percentage, where 0% means "no similarity" and 100% means "identical." An equivalence threshold, such as 80%, may be selected and applied to such similarity measures, such that the system considers a pair of objects to be equivalent if their degree of similarity exceeds the equivalence threshold.

Although only two resources 102*a-b* of two different types (backup and access control) are described in the example above, the system 100 may include any number of resources of any combination of types. Examples of resource types to which embodiments of the present invention may be applied include, but are not limited to: inventory management systems, capacity planning systems, utilization and chargeback systems, document management systems, archiving systems, file systems, operating systems, backup systems, search engines, shares, local hosts, Windows registries, directory services, discovery systems, replication systems, databases, change management systems, configuration management systems (CMDBs), disk arrays, servers, hosts, personal computers (PCs), switches, routers, network management systems, Windows log files, Windows Distributed File Systems (DFS), information lifecycle systems (ILM systems), tiering systems, IT workflow systems, virtual machines and virtual machine management servers, antivirus systems, security systems, applications, user-defined data sources, storage systems, tape libraries (physical and virtual), mobile devices, firewalls, business intelligence systems, data warehouses, extract transform and load (ETL) systems, enterprise integration and messaging systems, online (cloud) storage systems, online (cloud) backup systems, online (cloud) file systems, online (cloud) document management systems, and online (cloud) compute farms.

As a result, the techniques disclosed above for correlating data from two different resources may be applied to three or more resources of any combination of types. Note that the techniques disclosed herein may be useful to apply to multiple resources of the same type. For example, a large enterprise IT environment may include multiple backup systems from different vendors which are not integrated with each other. The techniques disclosed herein may be used to correlate data from such multiple backup systems to produce an integrated store of information about data backup in the IT environment which is not otherwise available from the environment's individual, incompatible backup systems.

In the example disclosed above with respect to FIGS. 1, 2, and 3A-3C, only metadata are collected, correlated with each other, and stored in the relationship model 128. One advantage of limiting data collection and other processing to metadata is that metadata may be collected and transmitted over the network 118 without opening, modifying, or otherwise interrupting the processing of the underlying data (e.g., files). As a result, the data collection and correlation processes disclosed herein may be implemented with minimal impact on the local IT environment. In fact, data collection and correlation may be performed automatically and remotely. As a result, such processing may be performed without requiring the local IT environment to be modified and without impacting the performance of the local IT environment.

In the particular example shown in FIG. 3C, the correlated data table 350 only includes data from the resources 102a-b which were positively correlated with each other. For example, correlated data table 350 does not include any data derived from record 110d (FIG. 3A) or record 112d (FIG. 3B) because those records did not correlate with any other records. This, however, is not a limitation of the present invention. Alternatively, for example, the relationship model 128 may include data from the resources 102a-b which did not correlate with any other data. For example, the data correlator 126 may store all of the data collected by the data retriever 122 in the relationship model 128, and use an appropriate data structure or other mechanism to indicate which data in the relationship model 128 were merely collected from a single one of the resources 102a-b and which data in the relationship model 128 were derived from multiple ones of the resources 102a-b as the result of a recognized correlation.

Figure 4:
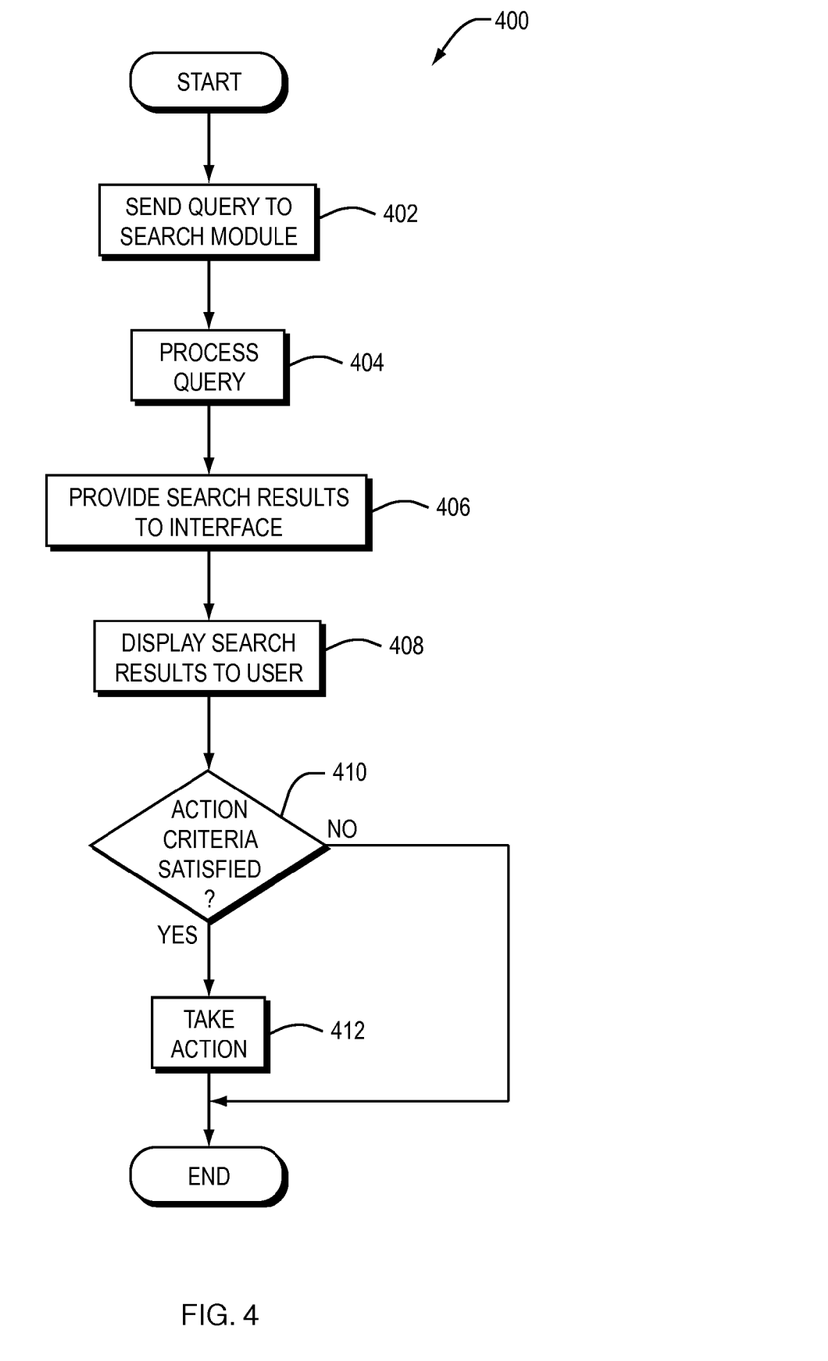
FIG. 4 is a flowchart of a method for querying a relationship model and drawing conclusions based on that query according to one embodiment of the present invention.
Figure 5:
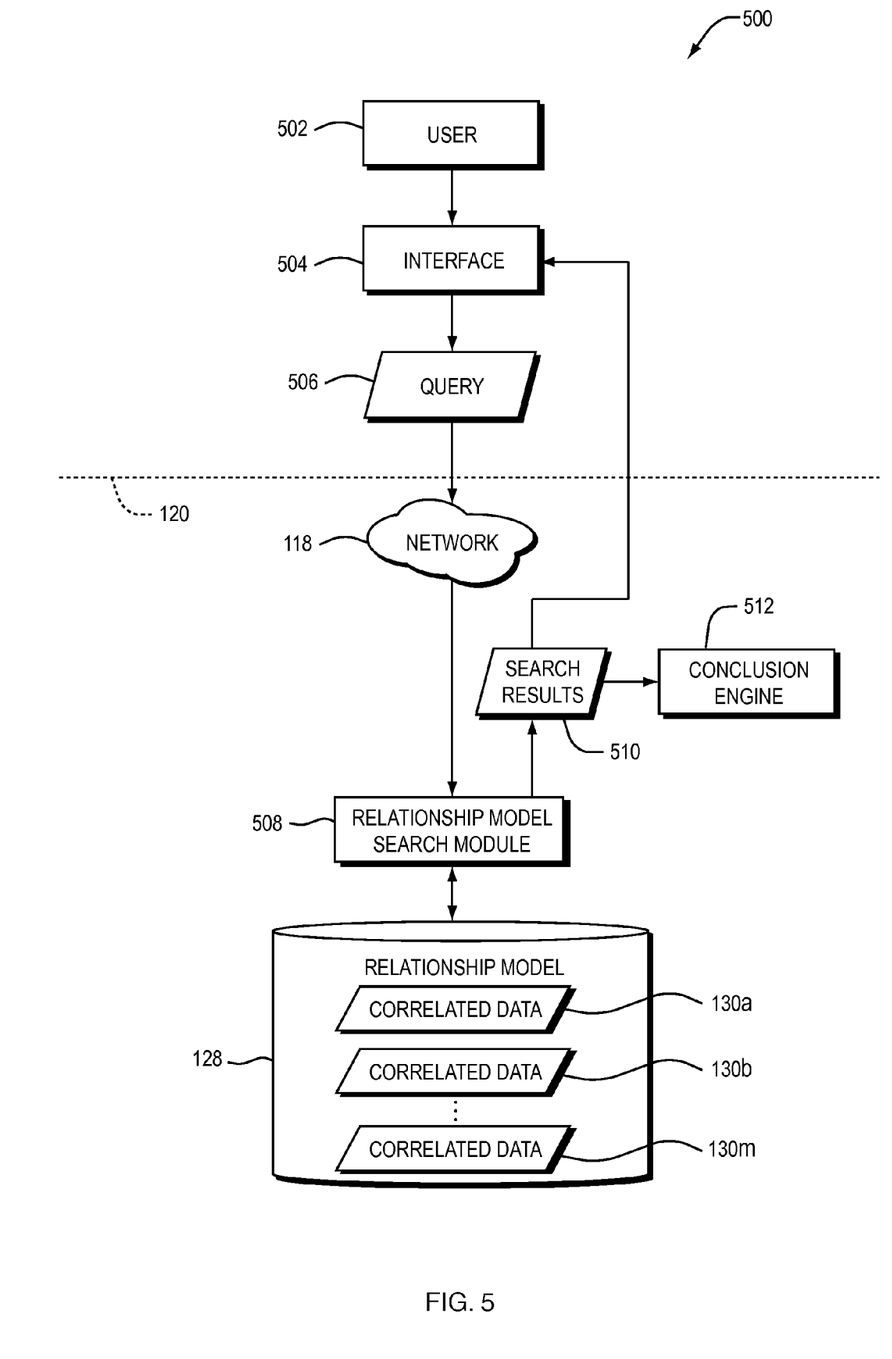
FIG. 5 is a dataflow diagram of a system for performing the method of FIG. 4 according to one embodiment of the present invention.

As shown in the system 500 of FIG. 5, the remote relationship model 128 may be accessible to users 502 of the local IT environment through an interface 504 accessible in the local IT environment, as shown in FIG. 5. FIG. 4 shows a flowchart of a method 400 that is performed by the system 500 of FIG. 5 according to one embodiment of the present invention.

The interface 504 may, for example, be a web-based interface operable by the user 502 through a standard web browser. The user 502 of the local IT environment may use the interface 504 to send a query 504 over the network 118 to a relationship model search module 508 (FIG. 4, step 402), which may query the relationship model 128 using the query 506 (step 404). The relationship model search module 508 provides the search results 510 over the network 118 to the interface 504 (step 406), which displays the search results 510 to the user 502 (step 408).

The relationship model search module 508 may be particularly useful for processing queries which include terms encompassing multiple resources, such as the backup and access control resources described in the example above, because such cross-resource queries can produce results which could not otherwise be obtained by querying any individual one of the resources in the local IT environment. An example of such a query is, "Which files does user jsmith have permission to access and which have been backed up within the last week?" Processing such a query requires querying data derived from multiple resources of different types, namely a backup system and access control system. Such a query cannot be processed by systems in conventional IT environments because the data necessary to process the query are stored in multiple disconnected systems.

Queries may be formulated in any kind of query language having any kind of syntax and semantics. For example, queries may include logical operators, such as AND (conjunctive), OR (disjunctive), and NOT (negation). Any term in a query may refer to data drawn from any resource. More generally, embodiments of the present invention are not limited to any particular technique for forming or processing queries on the relationship model 128.

Note that embodiments of the present invention need not perform queries on the relationship model 128 in response to user input. Rather, for example, the system may automatically perform queries and/or other processing on the relationship model 128 to draw conclusions from the data stored therein. For example, the relationship model search module 508 may be configured to automatically identify which files should be backed but which have not yet been backed up by performing an appropriate query on the relationship model 128, even if the user 502 does not submit such a query. In this example, any criteria may be used to determine whether a file should be backed up. For example, the automatic query may specify that a file should be backed up if it was created by a user having administrator access rights. The relationship model search module 508 may perform such a query automatically at any time, such as in response to an update of the relationship model 128 and/or according to a periodic (e.g., daily) schedule.

The system may take actions automatically in response to conclusions drawn from the correlated data in the relationship model 128 (steps 410, 412). For example, if the results of the query described above indicate that there are files which should be backed up but which have not yet been backed up, a conclusion engine 512 (FIG. 5) may draw the conclusion that such files should be backed up and instruct 514 the backup system 102a to back up the identified files and/or notify a system administrator that such files should be backed up. Actions which the system may take are not limited to actions executed by the resources 102a-b in the local IT environment. For example, the system may add to and/or modify data in the relationship model 128 in response to conclusions drawn from existing data in the 128.

The data retriever 122 may retrieve multiple snapshots data from the local IT environment over time. For example, the data retriever 122 may retrieve data from the local IT environment according to a predetermined schedule (e.g., every hour, day, or week) and/or in response to triggering events (such as execution of the backup system 102a or modification of the backup metadata 110a-n). When the data retriever 122 retrieves new data from the local IT environment, the data retriever 122 may either overwrite the previous version of the same data in the relationship model 128 or add the new version of the data to the relationship model 128.

In the latter case, the data retriever 122 may effectively create a chronological log of instances of the relationship model over time within the relationship model 128. One benefit of such a log is that it enables the relationship model 128 to be queried for information about data at different points in time. For example, the existence of a relationship model log enables the relationship model search module 508 to process a query such as, "Which files accessible to user jsmith were backed up every day last week?" Furthermore, the existence of a relationship model log enables the user 502 to be provided with historical information, such as in the form of graphs, illustrating changes in the relationship model over time.

The system may use the relationship model log to perform functions such as monitoring usage of the resources 102a-b and alerting system administrators and other users of any individual usages or usage patterns which warrant triggering an alert, such as usages which violate usage policies. For example, the system may use the relationship model log to alert a system administrator if: MP3 (digital music) files have been created on production file systems, in violation of a usage policy for such file systems; a particular user has created MP3 files in violation of a usage policy for that particular user or a particular class of users; a particular user has created 50% more data (or some other amount) more than he did the previous week; or a user outside of the finance department was granted access rights to the file system folder in which payroll data are stored.

The system may also use the relationship model log to automatically identify trends in relationship model data, for purposes such as making predictions about the future. For example, the conclusion engine 512 may use the search module 508 to query the relationship model 128 and use the query results to automatically predict when a backup system will run out of storage space based on trends in backup system storage utilization (derived from historical data collected from a backup system) and trends in storage capacity (derived from historical data collected from a capacity utilization system). In response to predicting that backup storage will run out in the near future, the conclusion engine may automatically take action, such as by automatically notifying a system administrator of the need to upgrade backup storage capacity.

Conventional systems used in IT environments cannot draw such conclusions and take such actions automatically because the necessary data from multiple systems are not correlated and accessible for integrated processing. In the example just provided, a conventional backup system cannot predict when it will run out of storage space because it does not have access to information about trends in overall system storage capacity and utilization, only information about backup storage utilization.

In the examples described above, data are collected from both resources 102a-b over time. Such techniques may also be applied to new resources as they are added to the local IT environment. For example, if a new hard disk drive or new backup system is installed in the local IT environment, the data retriever 122 may begin retrieving data from that new resource, and the data correlator 126 may include such new data in its correlation processes, from that point forward. If the relationship model 128 includes a log of relationship model data, such a log may only include data derived from the new resource as of the time at which the new resource was installed in the local IT environment.

Alternatively, however, old data relating to a newly-monitored resource (i.e., a resource newly added to the set of resources from which the retriever 122 is to retrieve information) may be provided to the data correlator 126, and thereby stored in the relationship model 128, retroactively. For example, if an existing backup system is added to the set of resources to be monitored by the system 100, and such a backup system includes a backup log dating back one year into the past, data from that backup log may be provided to the data correlator 126 and processed by the data correlator 126 as if that data had been collected on-the-fly from the new backup system in the manner described above. Furthermore, the backup log may be added to the relationship model log in the relationship model 128 for use in subsequent queries and other processing of the relationship model 128.

Embodiments of the present invention have a variety of advantages. For example, creating a single repository of data (such as metadata) derived from multiple sources enables IT managers to use a single access method to view all such data across the enterprise. This is not possible using existing systems. For example, the techniques disclosed herein may be used to enable an IT manager to see which data the backup system is and is not being backed up (and whether duplicate files are being backed up), which files are stored in the file system, and which files are being archived by the archiving system, all through a single interface. Furthermore, the IT manager may view relationships among data drawn from all sources of information in the IT environment.

Furthermore, because such relationships are recognized and recorded automatically, the IT manager is relieved of the responsibility for recognizing and storing such relationships manually, thereby significantly reducing the burden on the IT manager and decreasing the probability that such relationships will go unnoticed or not acted upon. In this way, the techniques disclosed herein not only make the IT manager's job easier, they reduce the likelihood of a system malfunction, such as the malfunctioning of an application (such as a backup application) when the data that it relies upon moves to a different location within the IT environment.

As described above, the relationship model may be created and stored remotely from the local IT environment. As a result, the functions performed by modules such as the data retriever 122, data correlator 126, search module 508, and conclusion engine 512 may be implemented as a web-based service which does not require the local IT manager to add additional storage capacity or take any other additional steps to create or maintain the relationship model 128, to draw conclusions from the data stored in the relationship model 128, or to take actions in response to those conclusions. At the same time, the local IT manager may use the interface 504 (FIG. 5) to access data in the relationship model 128 and perform queries on the 128 at any time. As a result, the IT manager is provided with the full power of the techniques disclosed herein, without imposing any significant overhead or burden on the IT manager for implementing those techniques.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions. Actions, such as those in the methods of FIG. 2 and FIG. 4, need not be performed in the sequences shown. Rather, such actions may be performed in any appropriate sequence.

The relationship model 128 may, but need not be, implemented as a database. Elements of the relationship model 128, such as the correlated data 130*a-m*, need not be implemented as database tables. Furthermore, the "tables" 300, 320, and 350 shown in FIGS. 3A, 3B, and 3C need not be implemented as database tables. The relationship model 128, but need not, be queried using database querying mechanisms. In general, the relationship model 128 may be stored in any appropriate form.

Techniques which are described herein as being applied to metadata may, alternatively or additionally, be applied to content (data). Furthermore, certain content may serve as both data and metadata, or as either data or metadata in different circumstances. For example, consider a word processing document containing text. Such text is an example of data. The techniques disclosed herein, however, may extract a small amount of such data and treat the extracted data as metadata describing the text. As another example, data stored in a directory servicer (such as Active Directory) may be interpreted as either meta-data or data. Techniques disclosed herein may be used to read such information and correlate it with other data.

Elements of the systems disclosed herein may be extensible. For example, new correlation logic may be added to the data correlator 126 of FIG. 1, in response to which the correlator 126 may apply such correlation logic (using, e.g., the techniques of FIG. 2) to new and/or old data in the system 100. As another example, new conclusion logic may be added to the conclusion engine 512 of FIG. 5, in response to which the conclusion engine 512 may apply such conclusion logic (using, e.g., the techniques of FIG. 4) to new and/or old data in the system 500

References herein to software "applications" are provided merely as examples of the kinds of software to which embodiments of the present invention may be applied. More generally, any references to software "applications" are equally applicable to any kind of software, such as operating systems, device drivers, or software libraries. Even more generally, the term "resource" (as in the examples of resources 102*a* and 102*b* in FIG. 1) may refer to any hardware, software, or combination thereof which may be associated with data.

The examples provided herein involved collecting data "remotely" from the local IT environment. Such "remote" collection may, however, include a combination of steps performed locally and remotely. For example, data may first be extracted locally (e.g., at the location of resource 102*a*) and processed locally (such as by converting the data into a different format) before transmitting the data to the data retriever 122. As another example, some or all of the functions performed by the data correlator 126 may be performed in the local IT environment (e.g., at the location of resource 102*a*), and the correlated data then transmitted over the network 118 to be stored remotely at the relationship model 128.

Data collection may be implemented in any of a variety of ways. For example, the data collectors 116*a-b* may be implemented as standalone software programs which communicate with resources 102*a-b* using application program interfaces (APIs), network communication protocols, shared files or memory, or other communications mechanisms. Alternatively, for example, collectors 116*a-b* may be implemented as plugins to a web browser or other program. Although it may be particularly advantageous to implement collectors 116*a-b* in a manner that does not require modifying the resources 102*a-b*, the collectors may be implemented by modifying the resources 102*a-b* directly, such as by reprogramming the resources 102*a-b*.

Although the particular example illustrated in FIG. 1 includes metadata, embodiments of the present invention may be implemented in conjunction with resources that do not include metadata. Rather, the techniques disclosed herein may be used to collect any kind of data. Furthermore, although the data 104*a-b* in FIG. 1 are illustrated as being stored within the corresponding resources 102*a-b*, this is not a limitation of the present invention. Instead, for example, some or all of the data associated with a resource may be stored externally to the resource. For example, one example of a resource is a backup application which stores its data in files on a hard disk drive, rather than within the backup application itself.

Furthermore, although certain examples described herein involve collection of automatically-created metadata, the same techniques may be applied to manually-created metadata. For example, a user may create and apply tags to files in a file system. Such tags are an example of manually-created metadata which may be processed in the same way as any other data described herein.

Although particular examples are provided above of conclusions that may be drawn by the conclusion engine 512, the present invention is not limited to drawing these particular conclusions. Another example of a conclusion that the conclusion engine 512 may draw is the conclusion that data have moved from one location to another. Such a conclusion may be drawn, for example, by recognizing that a file with a particular name, creation date, modification date, and size was previously indicated by the file system as being located at a particular path and is now indicated by the file system as being located at a different path.

As yet another example, the conclusion engine 512 may recognize that a change has been made to data in one resource describing a object and then conclude, based on that change, that corresponding changes should be made to data stored by other resources about the same object. For example, if the conclusion engine 512 recognizes that a file has moved from one path to another based on two snapshots of data derived from the file system, the conclusion engine 512 may conclude that the data associated with the backup system should be changed to reflect the new location of the file. In this case, the conclusion engine 512 may instruct the backup system to update its data accordingly so that the backup system continues to back up the file from its new location. Similarly, the conclusion engine 512 may recognize that a file which did not exist in an earlier snapshot exists in a later snapshot and, in response, the conclusion engine 512 may instruct the backup system to backup the new file.

Although certain examples herein refer to files stored in a file system as examples of "objects," objects need not be files. Other examples of objects include, but are not limited to user accounts, portions of files, folders (subdirectories) in a file system, database records, hosts, storage devices, and computers. More generally, an "object" may be any data structure or physical object.

The discussion above refers to certain examples of metadata that may be retrieved by the data retriever 122 and correlated by the data correlator 126. Such metadata are provided merely as examples and do not constitute limitations of the present example. Other non-limiting examples of metadata include filename, full file path, file size, creation time, modification time, last access time, type (e.g., file, link (shortcut), system, hidden), creator security ID (SID), creator permissions, access control list (ACL), and access control entries (ACEs), which may contain fields such as SID, type (e.g., allow, deny), permission (e.g., read, write), and inherited/explicit.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by at least one computer processor executing computer program instructions tangibly stored in at least one non-transitory computer-readable medium, the method comprising:
   (A) obtaining, over a network, first data from a first information technology (IT) subsystem of a first type;
   (B) obtaining, over the network, second data from a second IT subsystem of a second type, wherein the first type differs from the second type;
   (C) identifying a first portion of the first data, wherein the first portion refers to a first object, wherein the first object comprises one of: (1) a first data structure stored in the at least one non-transitory computer-readable medium, and (2) a first physical object;
   (D) identifying a second portion of the second data, wherein the second portion refers to a second object, wherein the second object comprises one of: (1) a second data structure stored in the at least one non-transitory computer-readable medium, and (2) a second physical object;
   (E) determining whether the first portion of the first data and the second portion of the second data refer to the same object as each other by correlating the first portion of the first data with the second portion of the second data;
   (F) if the first portion of the first data and the second portion of the second data are determined to refer to the same object as each other, then:
      (F1) storing the first portion, the second portion, and an indication that the first object and the second object are the same object remotely from the first and second resources;
   (G) if the first portion and the second portion are not determined to refer to the same object as each other, then:
      (G1) not storing an indication that the first object and the second object are the same object;
   (H) receiving a query over the network, wherein the query includes a first predicate and a second predicate;
   (I) determining whether the first portion satisfies the first predicate of the query;
   (J) determining whether the second portion satisfies the second predicate of the query; and
   (K) providing a response to the query over the network based on the outcomes of the determinations in (H) and (I), wherein the response to the query indicates whether the first portion satisfies the first predicate of the query and whether the second portion satisfies the second predicate of the query.

2. The method of claim 1, further comprising:
   (L) receiving, over the network, a request for information about the first object; and
   (M) in response to the request, providing, over the network, the first and second portion.

3. The method of claim 1, wherein (K) comprises:
   (K1) providing a first response to the query if the first portion satisfies the first predicate and the second portion satisfies the second predicate; and
   (K2) if the first portion does not satisfy the first predicate or the second portion does not satisfy the second predicate, then providing a second response, which differs from the first response.

4. The method of claim 1, wherein (K) comprises:
   (K1) providing a first response to the query if the first portion satisfies the first predicate or the second portion satisfies the second predicate; and
   (K2) if the first portion does not satisfy the first predicate or the second portion does not satisfy the second predicate, then providing a second response, which differs from the first response.

5. The method of claim 1, wherein the first IT subsystem comprises a first application.

6. The method of claim 1, wherein the first IT subsystem comprises a first device.

7. The method of claim 1, wherein the first IT subsystem comprises an application and wherein the second IT subsystem comprises a device.

8. The method of claim 1, wherein the first IT subsystem is at least one of a backup subsystem, an access control subsystem, an archive subsystem, and a file system.

9. The method of claim 8, wherein the second IT subsystem is at least one of a backup subsystem, an access control subsystem, an archive subsystem, and a file system.

10. The method of claim 1, further comprising:
(L) repeating (A)-(G) for a plurality of first data maintained by the first IT subsystem and a plurality of second data maintained by the second IT subsystem.

11. The method of claim 1, further comprising:
(M) repeating (A)-(G) for a plurality of first IT subsystems and a plurality of second IT subsystems.

12. The method of claim 1, wherein (A) comprises obtaining data from a file stored on a non-transitory computer-readable medium without opening the file.

13. The method of claim 12, wherein the data from the file comprises at least one of a filename, file creation date, file modification date, file size, and file creator.

14. The method of claim 1, wherein (A) comprises obtaining data from a file stored on a non-transitory computer-readable medium without modifying the file.

15. The method of claim 1, wherein the first data comprises metadata.

16. The method of claim 1, wherein the first data comprises unstructured data.

17. The method of claim 1, wherein (E) comprises using first correlation logic to determine whether the first object and the second object are equivalent to each other, and wherein the method further comprises:
(L) providing second correlation logic;
(M) using the second correlation logic to determine whether the first object and the second object are equivalent to each other; and
(N) if the second correlation logic determines that the first object and the second object are equivalent to each other, then storing an indication of a relationship between the first portion and the second portion remotely from the first and second IT subsystems.

18. A non-transitory computer-readable medium tangibly storing computer program instructions executable by at least one computer processor, the computer program instructions comprising instructions for:
(A) obtaining, over a network, first data from a first information technology (IT) subsystem of a first type;
(B) obtaining, over the network, second data from a second IT subsystem of a second type, wherein the first type differs from the second type;
(C) identifying a first portion of the first data, wherein the first portion refers to a first object, wherein the first object comprises one of: (1) a first data structure stored in the at least one non-transitory computer-readable medium, and (2) a first physical object;
(D) identifying a second portion of the second data, wherein the second portion refers to a second object, wherein the second object comprises one of: (1) a second data structure stored in the at least one non-transitory computer-readable medium, and (2) a second physical object;
(E) determining whether the first portion of the first data and the second portion of the second data refer to the same object as each other by correlating the first portion of the first data with the second portion of the second data;
(F) if the first portion and the second portion are determined to refer to the same object as each other, then:
(F1) storing the first portion, the second, portion and an indication that the first object and the second object are the same object remotely from the first and second resources;
(G) if the first portion and the second portion are not determined to refer to the same object as each other, then:
(G1) not storing an indication that the first object and the second object are the same object;
(H) receiving a query over the network, wherein the query includes a first predicate and a second predicate;
(I) determining whether the first portion satisfies the first predicate of the query;
(J) determining whether the second portion satisfies the second predicate of the query; and
(K) providing a response to the query over the network based on the outcomes of the first portion satisfies the first predicate of the query and whether the second portion satisfies the second predicate of the query.

19. A method performed by at least one computer processor executing computer program instructions tangibly stored in at least one non-transitory computer-readable medium, the method comprising:
(A) obtaining first data from a first information technology (IT) subsystem of a first type;
(B) obtaining second data a second IT subsystem of a second type, wherein the first type differs from the second type;
(C) identifying a first portion of the first data, wherein the first portion refers to a first object, wherein the first object comprises one of: (1) a first data structure stored in the at least one non-transitory computer-readable medium, and (2) a first physical object;
(D) identifying a second portion of the second data, wherein the second portion refers to a second object, wherein the second object comprises one of: (1) a second data structure stored in the at least one non-transitory computer-readable medium, and (2) a second physical object;
(E) determining whether the first portion of the first data and the second portion of the second data refer to the same object as each other by correlating the first portion of the first data with the second portion of the second data;
(F) if the first portion of the first data and the second portion of the second data are determined to refer to the same object as each other, then:
(F1) storing the first portion, the second portion, and an indication that the first object and the second object are the same object;
(G) if the first portion and the second portion are not determined to refer to the same object as each other, then:
(G1) not storing an indication that the first object and the second object are the same object;
(H) receiving a query over the network, wherein the query includes a first predicate and a second predicate;
(I) determining whether the first portion satisfies the first predicate of the query;
(J) determining whether the second portion satisfies the second predicate of the query; and
(K) providing a response to the query over the network based on the outcomes of the determinations in (H) and (I), wherein the response to the query indicates whether the first portion satisfies the first predicate of the query and whether the second portion satisfies the second predicate of the query.

20. A non-transitory computer-readable medium tangibly storing computer program instructions executable by at least one computer processor, the computer program instructions comprising instructions for:

(A) obtaining first data from a first information technology (IT) subsystem of a first type;

(B) obtaining second data from a second IT subsystem of a second type, wherein the first type differs from the second type;

(C) identifying a first portion of the first data, wherein the first portion refers to a first object, wherein the first object comprises one of: (1) a first data structure stored in the at least one non-transitory computer-readable medium, and (2) a first physical object;

(D) identifying a second portion of the second data, wherein the second portion refers to a second object, wherein the second object comprises one of: (1) a second data structure stored in the at least one non-transitory computer-readable medium, and (2) a second physical object;

(E) determining whether the first portion of the first data and the second portion of the second data refer to the same object as each other by correlating the first portion of the first data with the second portion of the second data;

(F) if the first portion of the first data and the second portion of the second data are determined to refer to the same object as each other, then:
(F1) storing the first portion, the second portion, and an indication that the first object and the second object are the same object;

(G) if the first portion and the second portion are not determined to refer to the same object as each other, then:
(G1) not storing an indication that the first object and the second object are the same object;

(H) receiving a query over the network, wherein the query includes a first predicate and a second predicate;

(I) determining whether the first portion satisfies the first predicate of the query;

(J) determining whether the second portion satisfies the second predicate of the query; and (K) providing a response to the query over the network based on the outcomes of the determinations in (H) and (I), wherein the response to the query indicates whether the first portion satisfies the first predicate of the query and whether the second portion satisfies the second predicate of the query.

21. A method performed by at least one computer processor executing computer program instructions tangibly stored in at least one non-transitory computer-readable medium, the method comprising:

(A) obtaining, over a network, first data from a first information technology (IT) subsystem of a first type, wherein the first data contains a first portion that refers to a first object, wherein the first object comprises one of: (1) a first data structure stored in the at least one non-transitory computer-readable medium, and (2) a first physical object;

(B) obtaining, over the network, second data from a second IT subsystem of a second type, wherein the second data contains a second portion that refers to the first object, wherein the first type differs from the second type;

(C) storing an indication that the first object and the second object are the same object;

(D) receiving a query over the network, wherein the query includes a first predicate and a second predicate;

(E) determining whether the first portion satisfies the first predicate of the query;

(F) determining whether the second portion satisfies the second predicate of the query;

(G) providing a response to the query over the network based on the outcomes of the determinations in (E) and (F), wherein the response to the query indicates whether the first portion satisfies the first predicate of the query and whether the second portion satisfies the second predicate of the query.

22. A non-transitory computer-readable medium tangibly storing computer program instructions executable by at least one computer processor, the computer program instructions comprising instructions for:

(A) obtaining, over a network, first data from a first information technology (IT) subsystem of a first type, wherein the first data contains a first portion that refers to a first object, wherein the first object comprises one of: (1) a first data structure stored in the at least one non-transitory computer-readable medium, and (2) a first physical object;

(B) obtaining, over the network, second data from a second IT subsystem of a second type, wherein the second data contains a second portion that refers to the first object, wherein the first type differs from the second type;

(C) storing an indication that the first object and the second object are the same object;

(D) receiving a query over the network, wherein the query includes a first predicate and a second predicate;

(E) determining whether the first portion satisfies the first predicate of the query;

(F) determining whether the second portion satisfies the second predicate of the query; and (G) providing a response to the query over the network based on the outcomes of the determinations in (E) and (F), wherein the response to the query indicates whether the first portion satisfies the first predicate of the query and whether the second portion satisfies the second predicate of the query.

23. The method of claim 1, wherein the first IT subsystem comprises a cloud-based IT subsystem.

24. The method of claim 23, wherein the second IT subsystem comprises a cloud-based IT subsystem.

25. The non-transitory computer-readable medium of claim 18, wherein the first IT subsystem comprises a cloud-based IT subsystem.

26. The non-transitory computer-readable medium of claim 25, wherein the second IT subsystem comprises a cloud-based IT subsystem.

27. The method of claim 1, wherein the first IT subsystem comprises a first device, and wherein the second IT subsystem comprises a second device.

28. The method of claim 1, wherein the first IT subsystem comprises a first software application, and wherein the second IT subsystem comprises a second software application.

29. The method of claim 28, wherein the first software application comprises a first operating system, and wherein the second software application comprises a second operating system.

30. The method of claim 1, wherein the first portion comprises a first filename, and wherein the second portion comprises a second filename.

31. The method of claim 1, wherein the first object comprises a first data structure, and wherein the second object comprises a second data structure.

32. The method of claim 31, wherein the first data structure comprises a first file in a file system, and wherein the second data structure comprises a second file in the file system.

33. The method of claim 31, wherein the first data structure comprises a first user account, and wherein the second data structure comprises a second user account.

34. The method of claim 31, wherein the first data structure comprises a first database record, and wherein the second data structure comprises a second database record.

35. The method of claim 1, wherein the first object comprises a first physical object, and wherein the second object comprises a second physical object.

36. The non-transitory computer-readable medium of claim 18, wherein the first IT subsystem comprises a first device, and wherein the second IT subsystem comprises a second device.

37. The non-transitory computer-readable medium of claim 18, wherein the first IT subsystem comprises a first software application, and wherein the second IT subsystem comprises a second software application.

38. The non-transitory computer-readable medium of claim 37, wherein the first software application comprises a first operating system, and wherein the second software application comprises a second operating system.

39. The non-transitory computer-readable medium of claim 18, wherein the first portion comprises a first filename, and wherein the second portion comprises a second filename.

40. The non-transitory computer-readable medium of claim 18, wherein the first object comprises a first data structure, and wherein the second object comprises a second data structure.

41. The non-transitory computer-readable medium of claim 40, wherein the first data structure comprises a first file in a file system, and wherein the second data structure comprises a second file in the file system.

42. The non-transitory computer-readable medium of claim 40, wherein the first data structure comprises a first user account, and wherein the second data structure comprises a second user account.

43. The non-transitory computer-readable medium of claim 40, wherein the first data structure comprises a first database record, and wherein the second data structure comprises a second database record.

44. The non-transitory computer-readable medium of claim 18, wherein the first object comprises a first physical object, and wherein the second object comprises a second physical object.

45. The method of claim 1, wherein (F) further comprises:
 (F2) determining that a first policy that applies to the first object differs from a second policy that applies to the second object; and
 (F3) performing an action in response to the determination of (F2).

46. The method of claim 45,
 wherein the action comprises instructing a computer system to perform the action on the second object.

47. The method of claim 1, wherein (F) further comprises:
 (F2) determining that a pattern of usage of the first object and the second object violates a usage policy; and
 (F3) performing an action in response to the determination of (F2).

48. The non-transitory computer-readable medium of claim 18, wherein (F) further comprises:
 (F2) determining that a first policy that applies to the first object differs from a second policy that applies to the second object; and
 (F3) performing an action in response to the determination of (F2).

49. The non-transitory computer-readable medium of claim 48, wherein the action comprises instructing a computer system to perform the action on the second object.

50. The non-transitory computer-readable medium of claim 18, wherein (F) further comprises:
 (F2) determining that a pattern of usage of the first object and the second object violates a usage policy; and
 (F3) performing an action in response to the determination of (F2).

* * * * *